United States Patent
Weaver et al.

(10) Patent No.: US 7,634,667 B2
(45) Date of Patent: Dec. 15, 2009

(54) USER-CONFIGURABLE POWER ARCHITECTURE WITH HOT-PLUGGABLE POWER MODULES

(75) Inventors: Jeffrey S. Weaver, Fort Collins, CO (US); Samuel M. Babb, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 809 days.

(21) Appl. No.: 10/193,788

(22) Filed: Jul. 12, 2002

(65) Prior Publication Data

US 2004/0010649 A1 Jan. 15, 2004

(51) Int. Cl.
- G06F 1/26 (2006.01)
- G06F 1/28 (2006.01)
- G06F 1/30 (2006.01)
- G06F 11/00 (2006.01)
- H02J 7/00 (2006.01)

(52) U.S. Cl. ............... 713/300; 713/330; 713/340; 710/302; 307/66

(58) Field of Classification Search ........... 713/300, 713/330, 340; 710/100, 302; 307/66
See application file for complete search history.

(56) References Cited

U.S. PATENT DOCUMENTS

| | | | | |
|---|---|---|---|---|
| 5,842,027 A | * | 11/1998 | Oprescu et al. | 713/300 |
| 5,896,282 A | | 4/1999 | Wu | 63/96 |
| 5,978,236 A | * | 11/1999 | Faberman et al. | 363/37 |
| 6,014,322 A | * | 1/2000 | Higashi et al. | 363/65 |
| 6,044,424 A | | 3/2000 | Amin | 710/103 |
| 6,055,647 A | | 4/2000 | Lacombe et al. | 714/14 |
| 6,088,221 A | | 7/2000 | Bologna | 361/685 |
| 6,121,695 A | * | 9/2000 | Loh | 307/64 |
| 6,201,319 B1 | * | 3/2001 | Simonelli et al. | 307/26 |
| 6,274,949 B1 | | 8/2001 | Lioux et al. | 307/64 |
| 6,282,596 B1 | | 8/2001 | Bealkowski et al. | 710/103 |
| 6,700,351 B2 | * | 3/2004 | Blair et al. | 320/125 |
| 6,737,763 B2 | * | 5/2004 | Liu et al. | 307/58 |
| 2002/0044026 A1 | * | 4/2002 | Coffey | 333/24 R |
| 2003/0023888 A1 | * | 1/2003 | Smith et al. | 713/300 |
| 2004/0010725 A1 | * | 1/2004 | Chan | 713/300 |

* cited by examiner

*Primary Examiner*—Thomas Lee
*Assistant Examiner*—Fahmida Rahman

(57) ABSTRACT

A power management system for use in a power-consuming system is disclosed. The system comprises one or more power module bays each adapted to have a power module hot-pluggably installed therein, the power module comprising an uninterruptible power supply (UPS) power module and a power supply unit (PSU) power module each adapted to be installed in the one or more power module bays; and a power module interface that connects power signals generated by installed power modules with one or more power buses in the system.

27 Claims, 8 Drawing Sheets

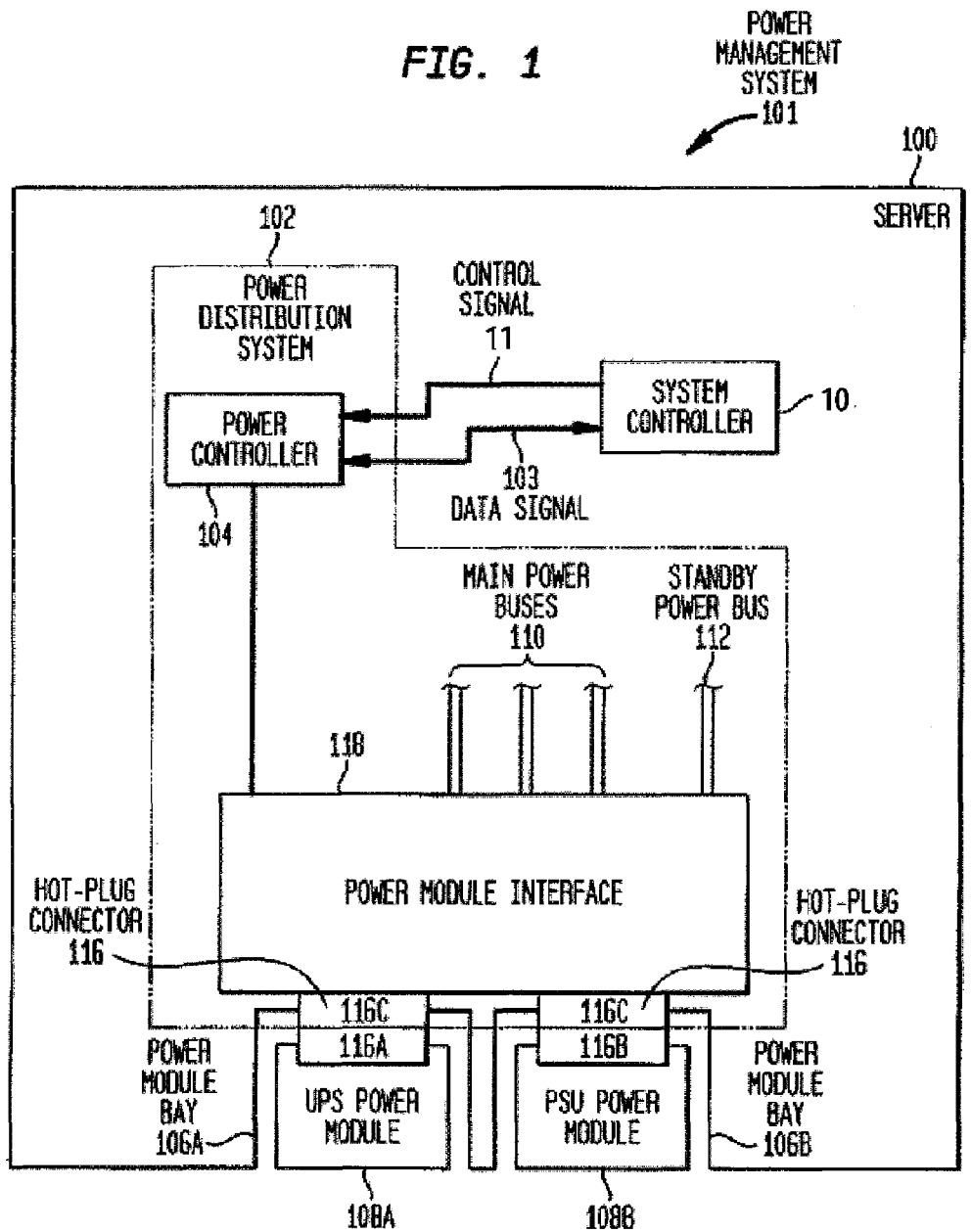

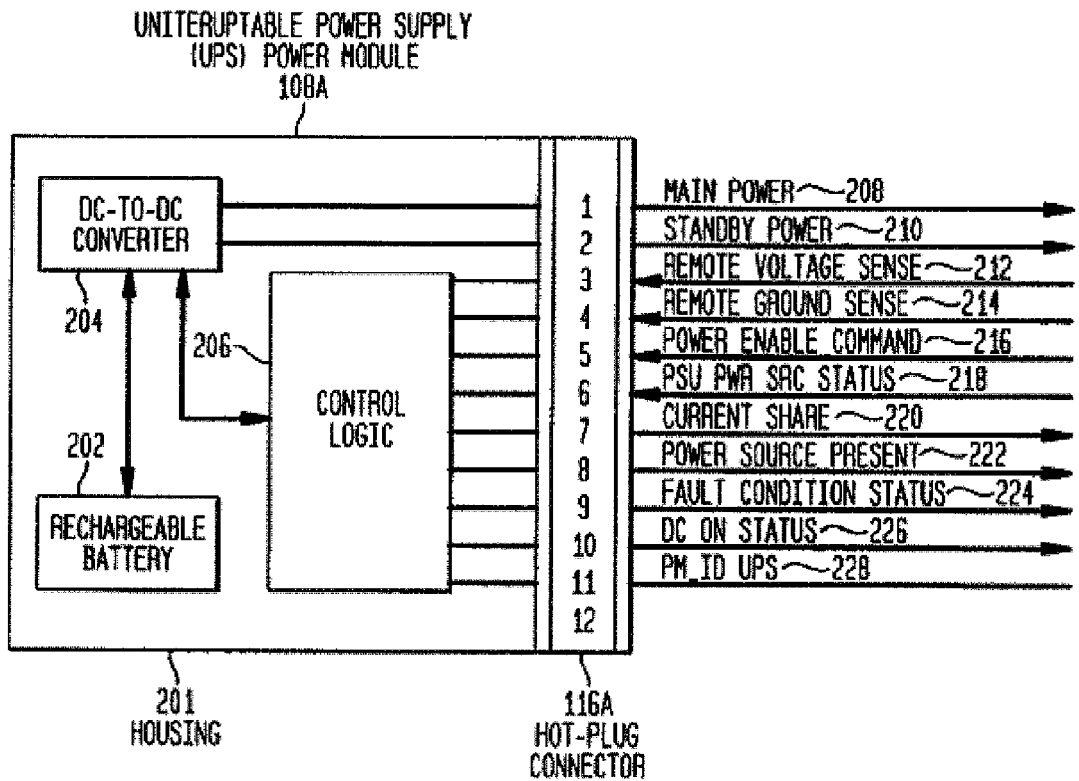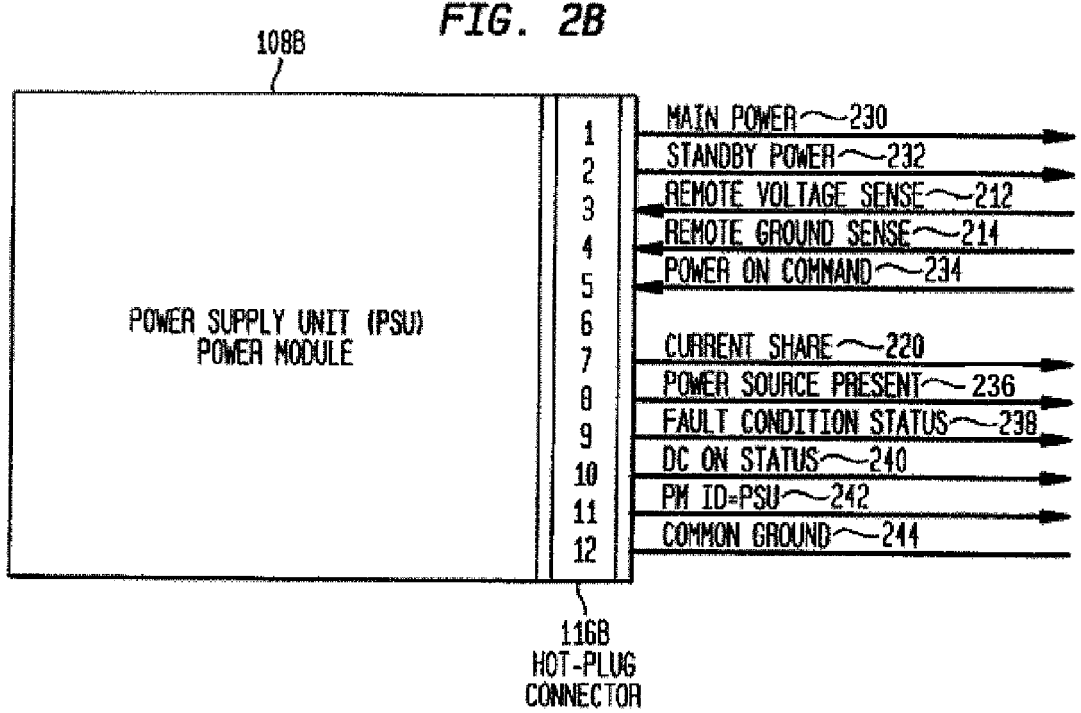

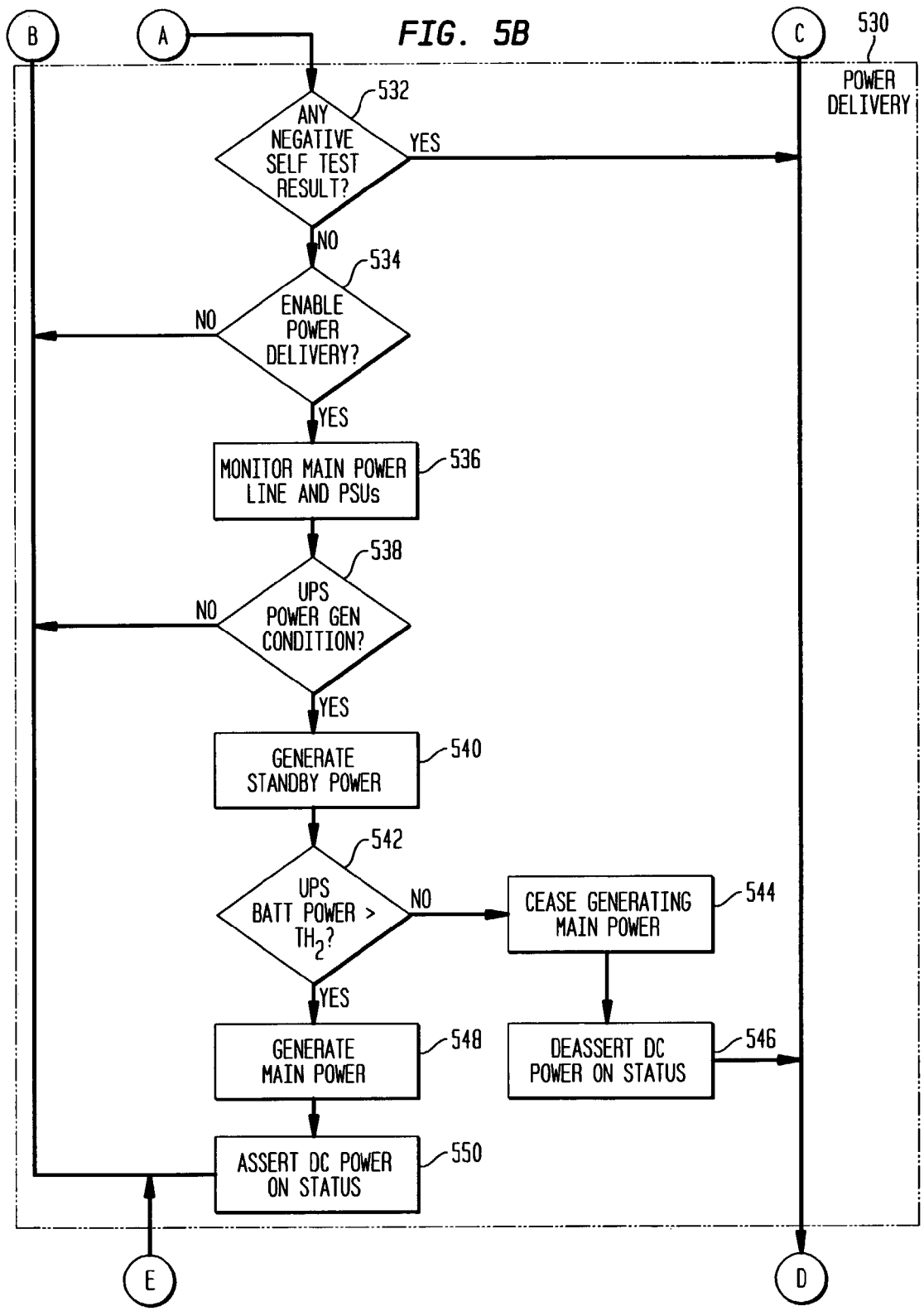

USER-CONFIGURABLE POWER ARCHITECTURE WITH HOT-PLUGGABLE POWER MODULES

BACKGROUND OF THE INVENTION

1. Field of the Invention

The present invention relates generally to providing power to power-consuming systems and, more particularly, to a user-configurable power architecture with hot-pluggable power modules.

2. Related Art

Many businesses are highly dependent upon the availability of client/server network systems to permit essential network services and functions to be carried out. Because such network services have become increasingly essential to everyday business operations, steps need to be taken to ensure continuous availability of the network systems. A primary concern in achieving this objective is to minimize or eliminate server downtime.

A common cause of server downtime is temporary or permanent loss of line power. Utility power failures and fluctuations can decrease server availability due to replacement of damaged hardware and/or reinstallation of software applications. Inconsistency in power availability also causes system lockups, crashes, lost data and faulty data transmissions. Consequently, state-dependent computer systems such as servers are inherently vulnerable to damage and data loss due to interruptions in electrical power.

To prevent data loss and the attendant inconvenience of server state loss, traditional servers have been supplemented with uninterruptible power supplies (UPSs). There are internal UPSs configured, for example, in the form of a plug-in card for installation within the server chassis. There are also external UPSs which are connectable in series with the server line power. A UPS typically contains a battery, a recharge circuit and a detection and switching circuit. The recharge circuit operates to maintain the battery in a charged state. The detection and switching circuit operates to provide battery power to the server upon detection of an interruption in line power. This maintains server availability at least for a limited time during which steps can be taken to safeguard information on the server from eventual loss when the UPS battery is exhausted.

There are a number of disadvantages associated with the use of external UPSs. For example, external UPSs require the use of additional desktop or floor space, along with additional power cables to connect the UPSs to the servers. This is particularly problematic in data centers in which many hundreds of servers can be collocated. In particular, rack-mounted systems are particularly difficult to support with external UPS devices due the number of servers that can be vertically arranged in a relatively small area of the data center. In addition, to provide the server with information regarding the status of its power source, external UPSs often have serial communications capabilities, which are connected through an external serial port on the server. Since many computer systems are configured with only one or two external serial ports, this communications link between the server and the UPS consumes a limited resource.

There are drawbacks associated with existing internal UPSs as well. For example, the batteries of the internal UPS must be accessible for exchange when the batteries exceed their operational life or otherwise need to be maintained. This requires power to server to be interrupted to enable the operator to open the server chassis and remove the UPS card. Such interruption to the server power causes an interruption in server availability.

SUMMARY OF THE INVENTION

In one aspect of the invention, a power management system for use in a power-consuming device is disclosed. The system comprises one or more power module bays each adapted to have a power module hot-pluggably installed therein, the power module comprising an uninterruptible power supply (UPS) power module and a power supply unit (PSU) power module each adapted to be installed in the one or more power module bays; and a power module interface that provides an electrical connection between power modules installed in the one or more power module bays and one or more power buses in the system.

In a further aspect of the invention, a set of power modules for providing a DC voltage to a power-consuming system when one or more of the power modules is installed in a power module bay thereof, is disclosed. The set of power modules comprises a power supply unit (PSU) power module configured to generate DC power derived from AC power provided to the PSU power module, the PSU power module comprising a first hot-plug connector and having a first form factor; and an uninterruptible power supply (UPS) power module configured to generate DC power derived from a rechargeable energy source within the UPS power module, the UPS power module comprising a second hot-plug connector electrically compatible with the first electrical connector and a second form factor substantially the same as the first form factor.

In another aspect of the invention, a hot-pluggable UPS power module removably insertable into a power module bay to mate with a hot-plug connector carried in the bay is disclosed. The UPS power module comprises a rechargeable battery; a converter circuit that converts DC power generated by the battery into DC power for the system; a controller that controls the operations the UPS power module based on whether a PSU power module installed in another power module bay is receiving AC power; and a hot-plug connector for interfacing with the hot-plug connector carried in the bay when the UPS power module is installed in the power module bay.

In another aspect of the invention, a method for controlling a uninterruptible power supply (UPS) power module adapted to be installed in a power module bay of a system in which a power supply unit (PSU) power module can be installed in another power module bay is disclosed. The method comprises: determining whether a power signal currently delivered to the system by the PSU power module is within specification; determining whether AC power is being delivered to the installed PSU power module; and causing the UPS power module to generate power when the monitored power signal is not within specification and when AC power to the installed PSU power supply is interrupted.

In a further aspect of the invention, a method for controlling UPS and PSU power modules installed in a plurality of power module bays of a power-consuming system is disclosed. The method comprises: determining system power requirement; determining which power modules are installed in each of the power module bays; causing installed UPS power modules to monitor installed PSU power modules and power buses to determine whether the UPS power module should generate power; causing installed PSU power modules to generate power and load share with other power modules that are concurrently generating power; and monitoring status signals generated by installed power modules to determine which installed power modules are generating DC power.

BRIEF DESCRIPTION OF THE DRAWINGS

Further features and advantages of the present invention as well as the structure and operation of various embodiments of the present invention are described in detail below with reference to the accompanying drawings. This description is given by way of example only and in no way restricts the scope of the invention. A brief description of the figures follows.

FIG. 1 is a simplified block diagram of an exemplary power-consuming system implementing a power distribution system in accordance with one embodiment of the present invention.

FIG. 2A is a schematic block diagram of an uninterruptible power supply (UPS) power module in accordance with one embodiment of the present invention.

FIG. 2B is a schematic block diagram of a power supply unit (PSU) power module in accordance with one embodiment of the present invention.

FIGS. 5A-5C are a flowchart of the operations performed by the UPS power module illustrated in FIG. 2A in accordance with one embodiment of the present invention.

DETAILED DESCRIPTION

Figure 3:
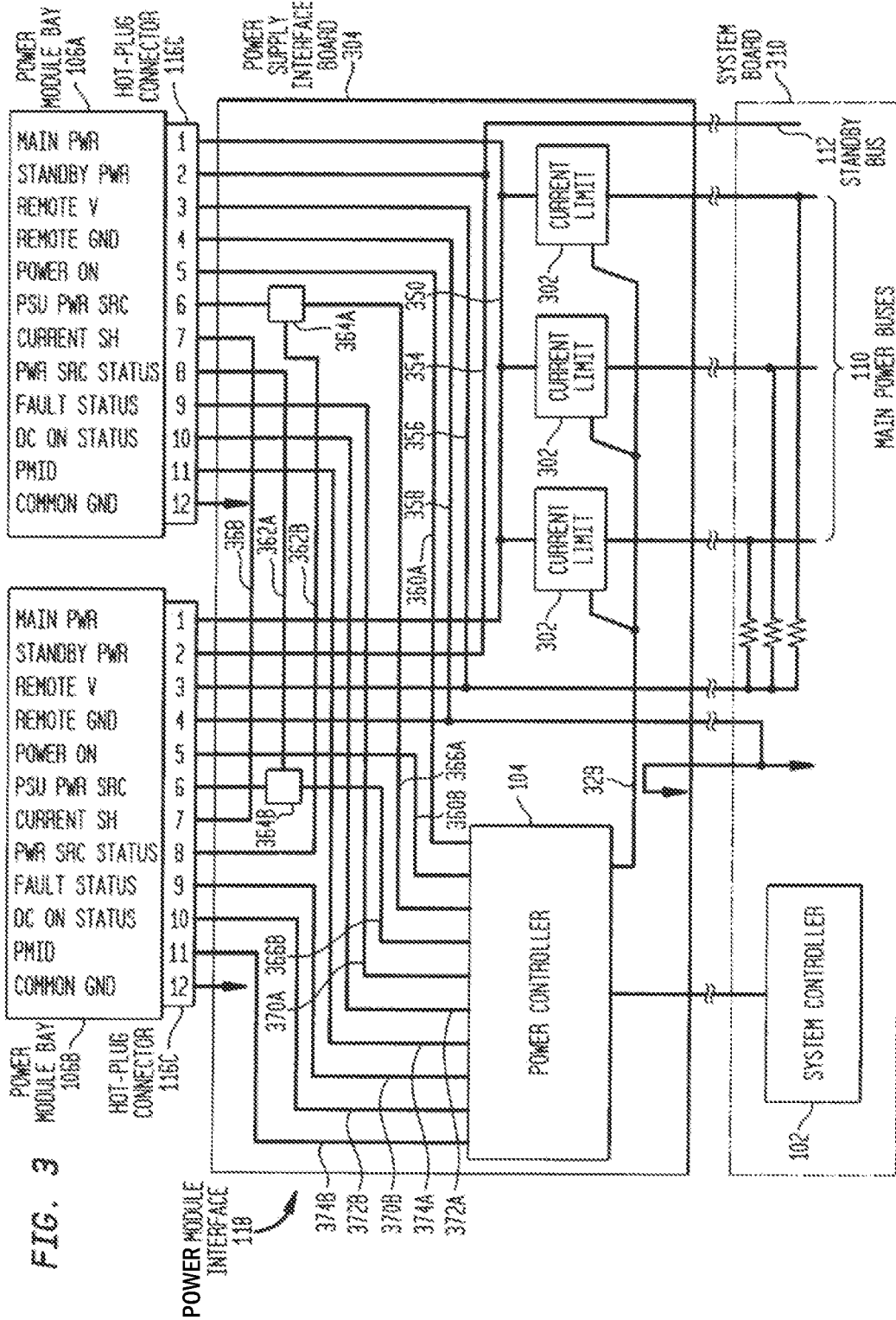
FIG. 3 is a schematic block diagram of one embodiment of a power supply interface board including the power module interface and the power controller illustrated in FIG. 1, and showing the electrical interface provided at each power module bay.

The present invention is directed to a user-configurable power architecture with hot-pluggable power modules, and a power-consuming system implementing the same. The present invention can be implemented in any power-consuming device now or later developed. The present invention has particular benefits when implemented in those power-consuming devices in which power must be continually supplied, such as computer systems. Embodiments of the present invention will be described herein with reference to a particular type of computer system commonly known as a server. FIG. 1 is a simplified block diagram of an exemplary server 100 with only the components related to the present invention depicted. In the following description, it is envisioned that server 100 is one of the many models of servers available from Hewlett-Packard Company, Palo Alto, Calif. It should be appreciated, however, that the present invention can be implemented in other types of computer, electronics or other systems that require power, and that the invention is not limited to any particular application or implementation.

Components of server 100 operate under the control of a system controller 10. System controller 10 may be embodied in a microprocessor, gate array, application specific integrated circuit (ASIC), or other control logic architecture, as well as any combination thereof. Preferably, system controller 10 is implemented in software code that is executed on a commercially-available microprocessor. Generally, such software code is stored in a memory device (not shown) accessible by such a microprocessor. In the exemplary application described below, the present invention is responsive to power-related requests of server 100 represented by control signals 11 generated by system controller 10.

Power management system 101 includes one or more power modules 108 each configured to generate power for server 100, and a power distribution system 102 for distributing to server 100 power provided by power modules 108. In the embodiment shown in FIG. 1, there are two power modules 108A and 108B, collectively and generally referred to as power modules 108. Power distribution system 102 comprises one or more power module bays 106 each adapted to operationally receive a power module 108. In the exemplary implementation illustrated in FIG. 1, there are two power module bays 106A and 106B, collectively and generally referred to as power module bays 106.

Power distribution system 102 also comprises a power module interface 118 that provides power signals generated by installed power modules 108 to one or more power buses 110, 112. Power buses 110, 112 distribute power throughout server 100, as is well-known in the art. Power controller 104 of power distribution system 102 manages power module interface 118 to deliver power to server 100 in accordance with control commands 101. Power module interface 118 also routes data and control signals between installed power modules 108 and power controller 104, as described herein. Collectively, power distribution system 102 and power modules 108 adapted for installation in power module bays 106 are referred to herein as power management system 101.

Each power module bay 106A and 106B is adapted to operationally receive a power module 108. In the exemplary embodiment illustrated in FIG. 1, there are at least two types of power modules 108 that can be installed in power module bays 106. One type of power module 108 includes those that provide DC power from a rechargeable battery, referred to herein as an uninterruptible power supply (UPS) power module 108A. Power module bay 106A has installed therein one embodiment of UPS power module 108A. Another type of power module 108 is a power supply unit (PSU) power module 108B that receives and converts AC power to DC power suitable for powering server 100. Power module bay 106B has installed therein a PSU power module 108B. UPS power module 108A and PSU power module 108B are described in detail below. Those of ordinary skill in the art should appreciate that power distribution system 102 can include any number of power module bays 106. It should also be appreciated that power modules 108 may include any type of power module now or later developed that can provide operational power to server 100.

FIGS. 2A and 2B are schematic block diagrams of two different types of power modules 108 that can be installed in power module bays 106 in accordance with one aspect of the present invention. In FIG. 2A, a block diagram of one embodiment of an uninterruptible power supply (UPS) power module 108A is illustrated. In FIG. 2B a block diagram of one embodiment of a power supply unit (PSU) power module 108B is illustrated. In the following description, power modules 108A and 108B will be described as being configured for installation in power module bays 106 of server 100 illustrated in FIG. 1.

In one embodiment, power modules 108 and power module bays 106 are dimensioned such that each power module bay 106 can receive only a particular power module 108. In an alternative embodiment, power modules 108 and power module bays 106 are dimensioned such that each power module bay 106 can receive only a particular type of power module 108. In such embodiments, for example, power module bay 106A is adapted to receive only power module 108A, not power module 108B. Similarly, power module bay 106B is adapted to receive only power module 108B, not power module 108A.

In a preferred embodiment of the invention, however, power modules 108 and power module bays 106 are dimensioned such that each power module bay 106 can operationally receive any power module 108. In one implementation of this embodiment, power modules 108 have a functionally equivalent mechanical interface and compatible electrical interfaces. With regard to the mechanical interface, the portion of power modules 108 that is installed in power modules bays 106 have substantially the same exterior configuration and dimensions. In other words, they have the same form factor. Power modules 108 having the same form factor enables power module bays 106 with corresponding dimensions to physically receive either power module 108A or power module 108B. It should also be appreciated that it is in the purview of those of ordinary skill in the art to configure a power supply unit to have the same form factor as UPS power module 108A. Accordingly, the physical attributes of both power modules are depicted as a rectangle in FIGS. 2A and 2B.

With regard to the electrical interface, UPS power module 108A and PSU power module 108B preferably have compatible electrical interfaces, as noted above. That is, the same or similar signals are received and transmitted on the same pin of connector 116A and connector 116B, while signals that are dissimilar or conflicting are received or transmitted on different pins of each connector 116A, 116B. Such compatibility enables either power module 108A, 108B to be installed in any power module bay 106 having a correspondingly-configured electrical connector. Such an embodiment is schematically illustrated in FIG. 1 in which the same electrical connector 116C is located at the rear of each power module bay 106A and 106B. In power module bay 106A, electrical connector 116C mates with an electrical connector 116A of UPS power module 108A while in power module bay 106B, electrical connector 116C mates with an electrical connector 116B of PSU power module 108B.

Consequently, in server 100 and other power-consuming systems having more than one power module bay 106, any desired combination of power modules 108 can be installed in power module bays 106 having an appropriately-configured electrical connector such as connector 116C. For example, either UPS power module 108A or PSU power module 108B can be installed in power module bay 106A. Similarly, either UPS power module 108A or PSU power module 108B can be installed in power module bay 106B. When such an embodiment is implemented in power modules 108 that are to be installed in power-consuming systems having a single power module bay 106, different types of power modules 108 can be installed in the power module bay 106 to support a given power requirement.

In one preferred embodiment, electrical connectors 116 for interfacing power modules 108 with power module interface 118 are hot-plug connectors. Hot-plug connectors are well-known devices that can be connected and disconnected without having to remove power from the mating components. As such, power modules 108 can be installed in or removed from power modules bays 106 without having to shut down or otherwise interfere with the operational status of server 100. Multiple power module bays 106 each adapted to hot-pluggably receive different types of power modules 108 provide significant advantages. For example, such a configuration enables the operator to install a desired combination of UPS and PSU power modules 108 in power module bays 106. The operator can configure the power architecture of server 100 in real-time and without having to remove power from server 100. For example, should one of two installed power modules 108 fail, the failed power module 108 can be removed from the power module bay 106 and replaced with an operational power module 108. This operation can be performed without having to remove power from the power buses, and while the other installed power module 108 continues to power server 100. Thus, the operator can quickly respond to changes in server power demand and power module operational status by altering the power architecture of server 100. Not only does this aspect of the invention insure server uptime, it provides for better overall serviceability of the system, which is a distinct advantage to both the operator and maintenance technician.

In accordance with one embodiment of the present invention, each power module 108 preferably includes all necessary components associated with the generation of DC power for server 100, including, as appropriate, the charging of an internal battery. Implementation of such self-contained power modules 108 provides many benefits. For example, server 100 need not include an AC-DC converter or a charge controller for each power module bay 106 since both are implemented in the appropriate power module 108. This results in significant space and cost savings, particularly in power management systems implementing a plurality of power module bays 106.

UPS power module 108A provides a number of advantages over conventional external and internal UPS power modules. For example, UPS power module 108A does not consume additional floor space nor does it require the additional cabling or use of a serial port as required for conventional external UPS systems. In addition, UPS power module 108A is completely accessible and can be maintained without having to interfere with the configuration or operational status of server 100, which is a problem of conventional internal UPS power modules.

Referring again to FIG. 1, server 100 includes one or more conventional DC power buses to distribute main power throughout server 100. In the exemplary embodiment illustrated in FIG. 1, server 100 includes three main power buses 110 and one standby power bus 112. Standby bus 112 distributes power to certain select components of server 100 under certain conditions such as when power is not available on main power buses 110. This insures power to be provided to certain device components under such abnormal power conditions.

Power management system 101 preferably selects for connection to power buses 110, 112 combinations of one or more installed power modules 108 to achieve a desired power configuration. Specifically, power controller 104 determines which power module(s) 108 is/are to provide power to main power buses 110 and, in embodiments in which server 100 includes a standby bus 112, to standby power bus 112. In the exemplary embodiment illustrated in FIG. 1, power module interface 118 includes power lines that terminate in connectors 116C of power module bays 106, and are connected to main and standby busses 110, 112. Such power lines, described in detail below, route power from installed power modules 108 to power buses 110, 112. In this embodiment, power controller 104 determines which type of power module 108 is installed each power module bay 106. Power controller 104 controls the installed power modules 108 based on the power requirements of server 100 and, preferably, the operational status of the installed power modules 108. In an alternative embodiment, the power lines in power module interface 118 are switched lines controlled by power controller 104. In such an embodiment, power management system 101 selectively interconnects installed power modules 108 with power buses 110, 112. In either case, power controller 104 can change the selected power modules 108 which are to power server 100 in the event of a power module failure, a change in power requirements or a change in installed power modules 108. As used herein, the term "power configuration" refers generally to the combination of one or more installed power modules 108 and the selected coupling of installed power modules 108 and power buses 110, 112.

Referring to FIG. 2A, UPS power module 108A comprises a rechargeable battery 202 located within a housing 201. A DC-to-DC converter circuit 204 converts power generated by battery 202 into DC power appropriate for transmission over main power bus 110 and standby power bus 112. Converter circuit 204 charges battery 202 using an external DC power source. Control logic 206 manages the electrical interface with server 100, and controls the operations of DC-to-DC converter 204. As noted, UPS power module 108A has an electrical interface adapted to be connected to server 100 when power module 108A is installed in a power module bay 106. In one noted embodiment, this electrical interface is implemented in a hot-plug connector 116A. In the embodiment illustrated in FIG. 2A, hot-plug connector 116A is a 12-pin connector adapted to mate with hot-plug connector 116C of power module interface 118. Details of the electrical interface are provided below.

At pin 1 of hot-plug connector 116A, UPS power module 108A generates main power signal 208 to provide power to server 100. Main power 208 is a DC power signal derived from power generated by battery 202. UPS power module 108A also receives power at pin 1 to charge internal battery 202. Standby power signal 210 is generated at pin 2 of UPS connector 116A. In this particular embodiment, UPS power module 108A does not charge battery 202 from standby power; accordingly, standby power 210 is not received by UPS power module 108A.

Remote sensing signals are received at pins 3 and 4 of hot-plug connector 116A. At pin 3, a remote voltage sense signal 212 is received while at pin 4 a remote reference signal (ground) 214 is received. Remote sense signals 212 and 214 are routed over a path through power module interface 118 that is separate from the electrical lines that carry main power 208 and standby power 210. Remote sense signals 212 and 214 travel over these separate lines from sensing circuitry (not shown) that senses the voltage level of DC power provided to server 100 on main power buses 110. Remote signals 212 and 214 are used by UPS power module 108A to determine whether the voltage level of main power 208 should be adjusted for example, to compensate for voltage drops over the power line between UPS power module 108A and main power buses 110.

At pin 5, UPS power module 108A receives a power enable command 216 generated by power controller 104. Power controller 104 controls the operational status of an installed UPS power module 108A via power enable command 216. Upon receipt of power enable command 216, UPS power module 108A monitors main power bus 110 and, upon detecting loss or degradation of the power signal on the monitored bus(es), generates main and standby power 208, 210. Further details of the operations performed by UPS power module 108A are provided below.

At pin 6, UPS power module 108A receives an AC source status signal 218 indicating the status of PSU power module(s) 108B installed in other power module bays 106. Specifically, signal 218 provides an indication of whether the required AC power required by PSU power modules 108B is currently being supplied to each installed PSU power module 108B. As will be described in detail below, an installed PSU power module 108B will immediately generate signal 218 upon the cessation of the AC power.

PSU power module 108B continues to generate power for a short time subsequent to the loss of AC power. This short time period is commonly referred to as the hold-up time of the power supply. Power supplies typically have a hold-up time of approximately 16-22 milliseconds. Due to this hold-up time, AC source status signal 218 indicates the loss of AC power for one to two cycles of AC power prior to the cessation of power generation by PSU power module 108B. In accordance with one aspect of the invention, UPS power module 108A immediately generates DC power 208 in response to a change in AC source status signal 218 that indicates the interruption of AC power to the installed PSU power modules 108B. This ensures that UPS power module 108A begins to generate main power 208 prior to the cessation of main power 230 generated by installed PSU power module(s) 108B.

At pin 7, UPS power module 108A receives current share signal 220. It is a well-known phenomenon that when multiple voltage sources simultaneously supply power over the same power line, a compensation scheme must be implemented to equally distribute the load. In accordance with certain embodiments of the invention, a current-sharing technique is implemented to modulate the current generated by the power modules 108 so that their output currents are substantially the same. One particular current-sharing technique implemented in power modules 108 is described in Intersil Technical Bulletin TB385 available from Intersil Holding Corporation, Irvine, Calif., which is hereby incorporated by reference herein.

At pin 8, UPS power module 108A generates a power source present signal 222 indicating the power source for the UPS power module 108A is available. For UPS power module 108A, signal 222 provides an indication of whether rechargeable battery 202 has sufficient stored energy to enable UPS power module 108A to reliably generate main power 208. The manner in which control logic 206 determines when and whether to generate power source present signal 222 is described below.

At pin 9, UPS power module 108A generates a fault condition status signal 224 for use by power controller 104. Power controller 104 determines the operational status of an installed UPS power module 108A based on a number of factors including whether any faults have been detected in the installed UPS power module 108A. UPS power module 108A performs periodic self-tests or otherwise monitors its capability to perform its operations, and provides the results of such self-monitoring to power controller 104 via fault condition status signal 224. The format of fault condition status signal 224 can be designed to accommodate different requirements. For example, in one embodiment, fault condition status signal 224 indicates whether or not a fault has been detected in UPS power module 108A. Alternatively, fault condition status signal 224 is formatted to indicate the current status of particular functional elements of UPS power module 108A. In such an embodiment, fault condition status signal 224 can provide the individual results of a plurality of self-tests, indicating which particular fault has been detected.

At pin 10, UPS power module 108A generates a Boolean signal 226 indicating whether DC power is currently being provided by UPS power module 108A. DC on status signal 226 is utilized by power controller 104 to determine which installed power modules 108 are generating DC power at any given time. The operations of power controller 104 are described further below.

At pin 11, UPS power module 108A generates a power module identification (PMID) signal 228 indicating that this power module is a UPS power module 108A. This signal is used by power controller 104 to determine which type of power module 108 is currently installed in each power module bay 106. In one embodiment, signal 228 is generated by UPS power module 108A as long as the power module 108 is installed in a power module bay 106.

Pin 12 is not used in some embodiments by UPS power module 108A, as shown in FIG. 2A.

Referring now to FIG. 2B, PSU power module 108B will now be described. It should be appreciated that power supply units are commonly-available devices. The electrical interface of PSU power module 108B preferably comprises a hot-plug connector 116B configured to electrically mate with hot-plug connector 116C in power module bays 106. As noted, the electrical interface of PSU power module 108B is preferably compatible with the electrical interface implemented in UPS hot-plug connector 116A described above with reference to FIG. 2A. The electrical interface provided by PSU power module 108B is described below.

At pin 1 of hot-plug connector 116B, PSU power module 108B generates main power signal 230 to provide main power to server 100. In contrast to UPS power module 108A, PSU power module 108B does not also receive power at pin 1 since there are no rechargeable battery in PSU power module 108B. At pin 2, PSU power module 108B generates standby power signal 232. In this particular embodiment, PSU power module 108B generates main power signal 230 and standby power signal 232 in response to a power on command signal 234 received at pin 5 and described below.

At pins 3 and 4, remote sense signals 212 and 214 are received. Remote sense signals 212 and 214 are described above with reference to the same pin numbers of UPS hot-plug connector 116A. PSU power module 108B uses remote sense signals 212, 214 to determine whether the voltage level of main power 230 should be adjusted to compensate for a voltage drop incurred in the transmission of main power 230.

At pin 5 of hot-plug connector 116B, PSU power module 108B receives a power on command 234 generated by power controller 104. In the embodiment described herein, power controller 104 generates power on command 234 whenever it senses that an operational PSU power module 108B is installed in a power module bay 106. In circumstances in which there are multiple PSU power modules 108B installed in multiple power module bays 106, all such PSU power modules 108B are enabled. Should more than one power module 108 generate power, the installed PSU power modules 108B will preferably load share.

Pin 6 of hot-plug connector 116B of the embodiment illustrated in FIG. 2b is not used by PSU power module 108B. As noted, at pin 6 of hot-plug connector 116C, power module interface 118 provides a signal indicating the availability of the AC power source for installed PSU power modules 108B. This information is not utilized in this illustrative embodiment of PSU power module 108B. Accordingly, this signal is not received and processed by PSU power module 108B.

At pin 7 of hot-plug connector 116B, PSU power module 108B receives current share signal 220. PSU power module 108B implements a current share technique such as that described above with reference to the same pin of UPS power module hot-plug connector 116B.

At pin 8 of hot-plug connector 116B, PSU power module 108B generates a power source present signal 236. As noted, power source present signal 236 reflects changes in status of the AC power supplied to PSU power module 108B.

At pin 9 of hot-plug connector 116B, PSU power module 108B generates a fault condition status signal 238. Fault condition status signal 238 is similar to fault condition status signal 224 generated by UPS power module 108A. Power controller 104 processes fault condition status signal 238 to determine whether PSU power module 108B can reliably generate main and standby power 230, 232.

At pin 10 of hot-plug connector 116B, PSU power module 108B generates a signal 240 indicating whether DC power is currently being generated by PSU power module 108B. DC on status signal 240 is utilized by power controller 104 to manage the user-configured power architecture of power management system 101. This is described in further detail below.

At pin 11 of hot-plug connector 116B, PSU power module 108B generates a power module identification (PMID) signal 242 indicating that this power module is a PSU power module 108B. This signal is used by power controller 104 to determine which type of power modules are currently installed in each power module bay 106. In one embodiment, PMID signal 242 is generated by PSU power module 108B as long as the power module is installed in a power module bay 106.

At pin 12 of hot-plug connector 116B, PSU power module 108B receives a common ground 244 that is shared with power module interface 118. PSU power module 108B uses common ground signal 244 in a conventional manner to generate main and standby power 230, 232.

As noted, in the exemplary embodiment of the invention illustrated in FIGS. 2A and 2B, UPS power module 108A and PSU power module 108B have operationally-compatible hot-plug connectors 116A, 116B, enabling the connectors to mate with the same, appropriately-configured hot-plug connector 116C. The embodiment of the power module bay connectors 116C that can be connected to either UPS power module 108A and PSU power module 108B connectors 116A, 116B is provided in FIG. 3 and described in detail below. FIG. 3 also illustrates the details of one embodiment of power module interface 118 showing the routing of signals between main and standby power buses 110, 112, power controller 104, and power module bays 106. In this illustrative embodiment, power controller 104 and power module interface 118 are implemented on a single printed circuit board, referred to in FIG. 3 as a power supply interface board 304.

Main power buses 110 and standby power bus 112 are initially routed to a system board 310. Power buses 110, 112 are thereafter routed to other power-consuming components (not shown) of server 100. In the illustrative embodiment shown in FIG. 3, system controller 10 is included in system board 310. The other components of server 100 and system board 310 are not relevant to the present invention and are not depicted in FIG. 3 for clarity.

As noted, at pin 1 of hot-plug connector 116A, UPS power module 108A generates main power signal 208. At pin 1 of hot-plug connector 116B, PSU power module 108B generates main power signal 230. These power signals 208, 230 are received at pin 1 of hot-plug connector 116C of each power module bay 106. Power module interface 118 includes a main power line 350 that connects pin 1 of hot-plug connector 116C in each power module bay 106 to main power buses 110 through a current limit circuit 302. Each current limit circuit 302 monitors a respective main power bus 110 for a current limit condition. Current limit circuits 302 are well-known circuits that provide the results of is this monitoring operation to power controller 104 via signal path 329. It should be noted that in this illustrative embodiment, main power pin 1 of hot-plug connectors 116C are connected to each other. In such an embodiment, an installed UPS power module 108A can receive power generated by an installed PSU power module 108B, and can charge battery 202 while installed in a power module bay 106. UPS power module 108A can maintain rechargeable battery 202 at a full charge level under normal operating conditions. In certain embodiments, UPS power module 108A automatically performs such charging operations and at a rate that is dependent on system load.

Similarly, at pin 2 of hot-plug connector 116A, UPS power module 108A generates standby power signal 210 while at pin 2 of hot-plug connector 116B PSU power module 108B generates standby power signal 232. Power module interface 118 includes a standby power line 354 that connects pin 2 of hot-plug connector 116C of each power module bay 106 to standby power bus 112. As noted, standby power bus 112 provides standby power to essential components of server 100.

As noted, at pins 3 and 4 of hot-plug connectors 116A and 116B, remote sensing signals 212 and 214 are received by installed UPS and PSU power modules 108A and 108B, respectively. In the exemplary embodiment illustrated in FIG. 3, pins 3 and 4 of hot-plug connector 116C of each power module bay 106 is connected to a remote voltage sense signal line 356 and a remote ground signal line 358, respectively. Remote voltage sense signal line 356 is connected through a resistor to each main power bus 110. Remote ground signal line 358 is connected to a ground source on system board 310. Thus, remote signals 214, 216 are generated at the load and are transmitted over separate paths 356, 358 to hot-plug connectors 116C. As noted, remote sense signals 214, 216 provide and indication of the voltage level of the main power received at system board 310, and are utilized by power modules 108 to adjust the voltage level of the power signals to compensate for such losses.

As noted, at pin 5 of hot-plug connectors 116A, 116B power enable command 216 and power on command 234, respectively, are received. Power enable command signal 216 and power on command signal 234 are generated by power controller 104. Power controller 104 is connected to pin 5 of hot-plug connectors 116C in power module bays 106 via power control lines 360A and 360B, respectively. As will be described in greater detail below, power controller 104 generates power commands 216, 234 in response to determining that an operational power module 108 is installed in the power module bay 106. In response to power on command 216, an installed UPS power module 108A monitors main power bus 110, and generates main and standby power 208, 210 when conditions warrant. In response to a power on command 234, an installed PSU power module 108B generates main and standby power 230, 232.

As noted, an installed UPS power module 108A receives a power source present signal 236 directly from each installed PSU power module 108B. This signal is received at pin 6 of hot-plug connector 116C of each power module bay 106. As noted, UPS power module 108A has a pin 6 in hot-plug connector 116A to receive the signal. In contrast, PSU power module 108B does not utilize the power source status of other installed power modules. Accordingly, hot-plug connector 116B of PSU power module 108B does not have a pin 6 to receive such a signal. The signal received at pin 6 of hot-plug connectors 116C is generated at pin 8 of connectors 116 by both power modules 108. UPS power module 108A generates power source present signal 222 indicating the status of battery 202, while PSU power module 108B generates power source present signal 236 indicating the status of its AC power source.

In accordance with one embodiment of the present invention, an installed UPS power module 108A receives an immediate indication of each PSU power source present signal 236 regardless of which power module bay 106 the power module 108A is installed. In this aspect of the invention, UPS power module 108A is an intelligent power module capable of determining whether to generate main and standby power 208, 210. To provide an installed UPS power module 108A with each PSU power source present signal 236 regardless of which power module bay 106 the UPS power module 108A is installed, power module interface 118 routes power source present signals 236 from pin 8 of each hot-plug connector 116C to pin 6 of connector 116C of each other power module bay 106. In power module interface 118, power source status lines 362A, 362B each connect pin 6 of one hot-plug connector 116A with pin 8 of the other hot-plug connector 116A, and with power controller 104. To enable any type of power module 108 to be installed in any power module bay 106, power source status lines 362A, 362B are switched lines. Power controller 104 controls switches 364A and 364B via switch control lines 366A, 366B, respectively. When power module ID signals 228, 242 indicate that there is a UPS power module 108A and a PSU power module 108B concurrently installed in power module bays 106, power controller 104 opens one switch 364 and closes the other switch 364 to enable the installed PSU power source present signal 236 to be received by the installed UPS power module 108A.

Pin 7 of each connector 116A, 116B is connected to current share circuitry (not shown) in each installed power module 108. Power module interface 118 includes a single current share line 368 that connects pin 7 of one hot-plug connector 116C with pin 7 of the other hot-plug connector 116C. Well-known circuitry in each power module 108 monitors current share line 368 and determines the current level at which to generate main power.

At pin 9 of each connector 116A and 116B, fault condition status signals 224, 238 are generated by UPS and PSU power modules 108A, 108B, respectively. Corresponding pin 9 of hot-plug connector 116C of each power module bay 106A, 106B is connected to power controller 104 via a fault status line 370A, 370B, respectively. Power controller 104 uses fault condition status signals 224, 238 as described elsewhere herein to determine the availability of installed power modules 108.

Similarly, DC on status signals 226 and 240 generated at pin 10 of each hot-plug connector 116A, 116B, respectively is received at a corresponding pin 10 of hot-plug connectors 116A in power module bays 106. Pin 10 of hot-plug connectors 116A are connected to power controller 104 via DC status lines 372A and 372B. Power controller 104 uses DC status signals 226 and 240 as described elsewhere herein to determine the current operational status of installed power modules 108A and 108B, respectively.

Also, PM ID signals 228 and 242 are generated at pin 11 of hot-plug connector 116A, 116B, respectively, and are received at a corresponding pin 11 of hot-plug connectors 116C in power module bays 106A, 106B, respectively. Pin 11 of hot-plug connector 116C of each power module bay 106A, 106B is connected to power controller 104 via power module (PM) identification (ID) lines 374A and 374B, respectively. Power controller 104 uses PMID signals 228 and 242 as described elsewhere herein to determine the type of power module 108 installed in each power module bay 106.

Pin 12 of each hot-plug connector 116C is connected to a ground source in power module interface board 304. As noted, this ground reference is utilized by installed PSU power modules 108B to generated main and standby power 230, 232, and is not used by UPS power module 108A.

In one embodiment, power module interface 118 is a self-contained component of server 100 that isolates the power-related components from the other components of server 100. For example, in one embodiment, power supply interface board 304 is housed in a safety enclosure that connects power busses 110, 112 with installed power modules 108. In another embodiment, other connections are provided by power module interface 118 which are managed by power controller 104.

It should be understood by those of ordinary skill in the art that a myriad of power configurations can be implemented in a computer system implementing the power management system 101 of the present invention. To further illustrate the capabilities of the present invention, a few of the states that can be attained by the embodiment of power management system 101 described above is illustrated in FIG. 4 and described below. In this example, there are two power module bays 106A and 106B having similar dimensions and which are adapted to receive either a UPS power module 108A or a PSU power module 108B. The power modules 108 have operationally-compatible electrical interfaces and the same form factor.

Figure 4:
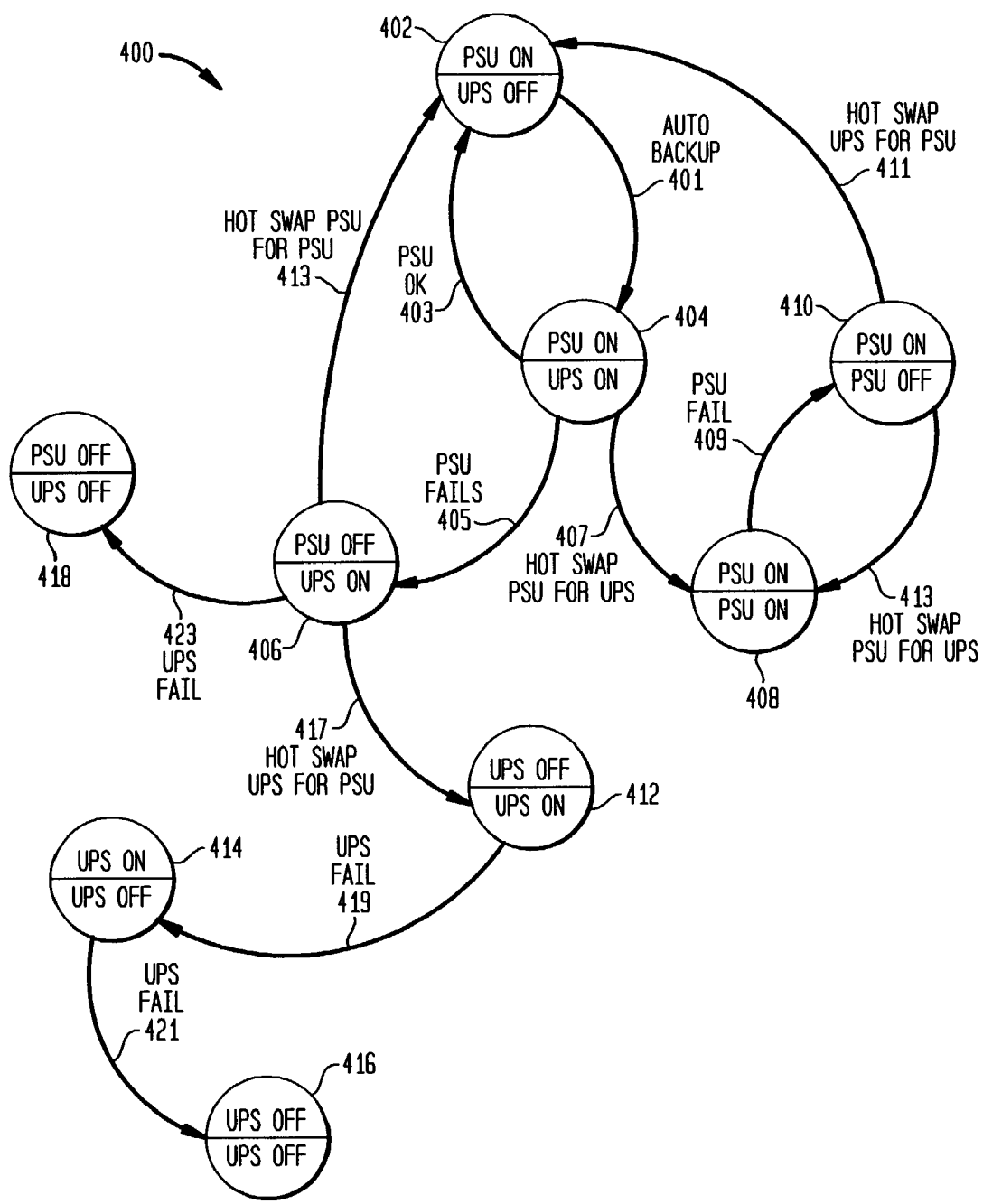
FIG. 4 is a state diagram illustrating some of the different power architecture states that can be attained by one embodiment of the present invention when implemented in a power-consuming system having two power module bays.

In FIG. 4, each state bubble represents a state defined by power modules 108 that are installed in each power module bay 106. Each bubble is divided in half by a horizontal line with each semicircle including information pertaining an associated power module bay 106. In each semicircle a power module identifier indicating the type of power module 108 installed in the associated power module bay 106 is provided. Adjacent to each power module identifier is an indication of whether the installed power module 108 is on or off.

Beginning at state 402, a PSU power module 108B is installed in one power module bay 106 while a UPS power module 108A is installed in the other. In this state, the installed PSU power module is generating DC power while the installed UPS power module 108B is off. The term "off" refers to the UPS power module 108A being enabled and monitoring main power buses 110, but not generating main or standby power 208, 210. Thus, installed PSU power module 108B is on while installed UPS power module 108A is enabled to generate power should the installed PUS power module(s) fail. Transition 401 occurs in response to the occurrence of an auto backup condition, placing power management system 101 into state 404.

Power management system 101 will follow transition 403 back to state 402 if the condition that caused the automatic backup ceases. Such a circumstance may be, for example, if there is a perturbation on main power bus 110. To insure that power is always provided by power management system 101, UPS power module 108A will immediately begin generating power upon sensing such a condition. Should the condition be momentary, UPS power module 108B will cease generating power and return to monitoring main power buses 110. This causes power management system 101 to follow state transition 403 to state 402. Transition 403 is identified as "PSU OK" to indicate that the installed PSU power module 108B can independently provide power to server 100.

While in state 404 in which there is a PSU power module 108B installed in one power module bay 106 and a UPS power module 108A installed in the other, and both are generating DC power, the UPS power module 108A will eventually deplete its energy stores. At any point in state 404, the operator can replace the installed UPS power module 108A with another PSU power module 108B. This is represented by state transition 407 to state 408. When a PSU power module 108B is installed in a power module bay 106, the installed PSU power module 108B turns on and load shares with the PSU power module 108B previously installed in the other power module bay 106. As shown, in state 408, then, there is a PSU power module 108B in each power module bay 106, and each installed PSU power module 108B is generating power.

While in state 408, one of the installed PSU power modules 108B can fail. The resulting state is state 410 in which two PSU power modules 108B are installed with only one of the PSU power modules 108B generating power. Thus, when a PSU power module 108B fails while in state 408, power management system 101 follows transition 409 from state 408 to state 410. While in state 410 the failed PSU power module 108B can be hot-swapped with an operational PSU power module 108B or UPS power module 108A. If the failed PSU power module 108B is hot-swapped with a UPS power module 108A, power management system 101 follows state transition 411 from state 410 to state 402. If the failed PSU power module 108B is hot-swapped with a PSU power module 108B, power management system 101 follows state transition 413 from state 410 to state 408.

Returning to state 404 in which there is an installed PSU power module 108B and an installed UPS power module 108A. Both of these installed power modules 108 are generating DC power due to UPS power module 108B sensing a condition that may indicate an imminent failure of the installed PSU power module 108B. If installed PSU power module 108B does indeed fail, then power management system 101 will follow state transition 405 from state 404 to state 406. At state 406, the installed PSU power module 108B is not operational while the installed UPS power module 108A generates DC power. While in this state there are a number of events that can occur to cause a state transition. Three such events are shown in FIG. 4. The failed PSU power module 108B can be hot-swapped with another PSU power module 108B or a UPS power module 108A, or no operator action can take place and the installed UPS power module 108A powers server 100 until its energy stores are depleted.

If the failed PSU power module 108B is hot-swapped with an operational PSU power module 108B, then power management system 101 follows state transition 413 from state 406 to state 402. As noted, in state 402 the installed PSU power module 108B generates DC power while the installed UPS power module 108A does not. When power management system 101 enters state 402 from either state 404 or state 406, the installed UPS power module 108A will recharge its energy stores while the installed PSU power module 108B powers the server.

On the other hand, if failed PSU power module 108B is hot-swapped with a UPS power module 108A, then power management system 101 follows state transition 417 from state 406 to state 412. The newly-installed UPS power module 108A will monitor main power bus 110 and not provide DC power while the other installed UPS power module 108A provides sufficient DC power. If that UPS power module 108A fails, power management system 101 will follows state transition 419 to state 414 at which the other installed UPS power module 108A begins to generate power. Should that UPS 108A power module ultimately fail with no other changes made to the power configuration, power management system 101 will follow state transition 421 to state 416 in which both installed UPS power modules 108A are not generating power. In such a state, server 110 would shutdown operations.

Returning to state 406 in which the installed PSU power module failed and is not generating DC power while the installed UPS power module 108A provides server power. If no state changes are invoked by the operator, the energy stores in installed UPS power module 108A will eventually deplete.

This will cause power management system 101 to follow state transition 423 from state 406 to state 418 at which both, the installed PSU power module 108B and the installed UPS power module 108A do not generate power. This will cause the server to shut-down.

As noted, there are numerous other states that the exemplary power management system 101 can attain, and that power management system 101 provides the operator with significant flexibility to selecting a power architecture appropriate for a given circumstance. It also the operator to quickly and efficiently change the power architecture as the circumstances change without having to power off server 100.

Figure 5A:
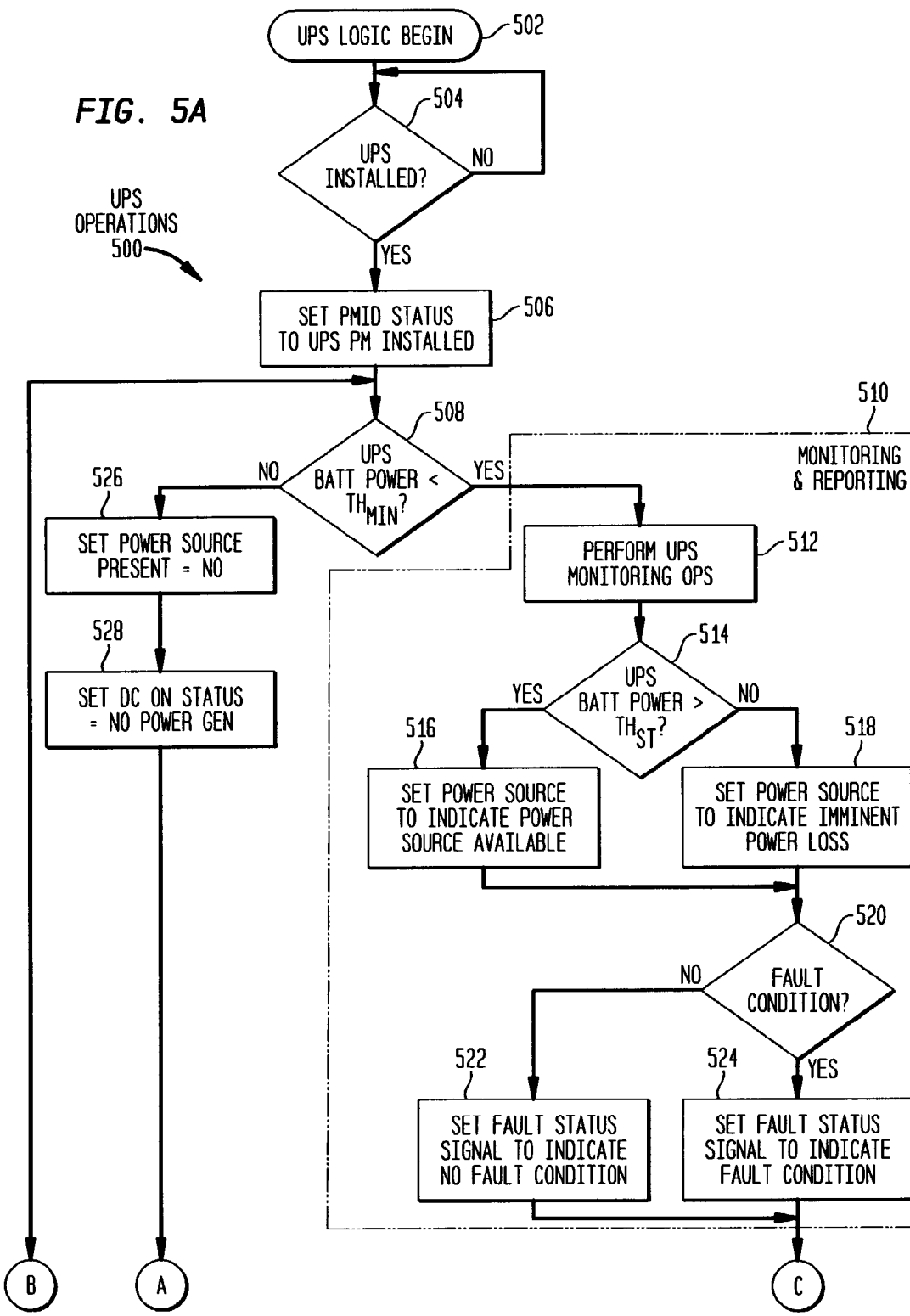
Figure 5C:
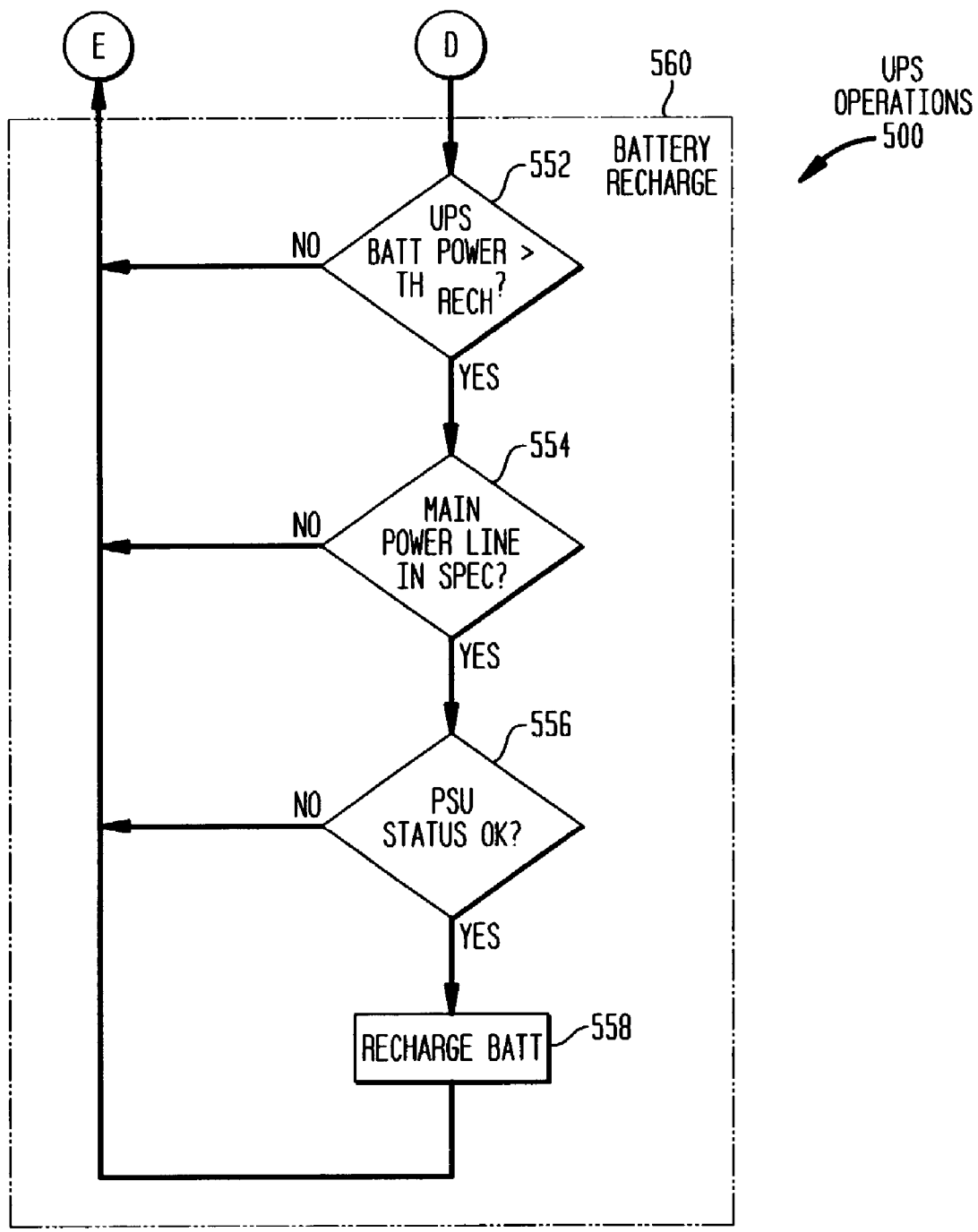

FIGS. 5A-5C are a flowchart of the operations performed by one embodiment of UPS power module 108A of the present invention. The sequence of steps illustrated in UPS operations 500 are exemplary only; alternative embodiments of UPS 108A perform additional and different operations and/or the same operations in a different sequence.

At block 502, the UPS logic begins. At block 504, UPS power module 108A determines or senses whether it is installed in a power module bay 106. If it is not currently installed, then UPS power module 108A remains idle, periodically checking to determined its installation status. When UPS power module 108A is installed, operations advance to block 506. At block 506, installed UPS power module 108A generates at pin 11 of connector 116A a power module identification (PMID) signal 228 indicating that the this installed power module 108 is a UPS power module 108A. As noted, this identification information is used by power controller 104.

Installed UPS power module 108A then measures the quantity of energy stored in rechargeable battery 202. There are a number of well-known techniques that can be used to measure the stored energy in a battery or other energy storage device. Any such technique now or later developed can be implemented in UPS power module 108A. The current quantity of energy is compared with a minimum threshold level suitable for providing power to the host computer system, here server 100. If this minimum quantity of energy is not available in battery 202, then operations advance to block 526. At block 526, installed UPS power module 108A generates at pin 8 of hot-plug connector 116A a power source present signal 222 having a value indicating that installed UPS power module 108A does not contain an adequate power source. UPS power module 108A generates a DC ON status signal 226 at pin 10 of hot-plug connector 116A at block 528. This signal is set to indicate that no DC power is currently being generated by this installed UPS power module 108A. Processing then advances through page connector C to logic described below.

If at block 508 UPS power module 108B determines that the minimum quantity of energy necessary to provide power to server 100 is available in battery 202, then operations advance to a series of steps that collectively perform the function of monitoring and reporting 510, as illustrated by the dashed box around blocks 512-524. At block 512, installed UPS power module 108A performs self-test and other monitoring operations. The results of these operations are processed in subsequent steps. At block 514, the UPS battery energy level is compared with another threshold value. In this step, the threshold value is greater than the minimum threshold value noted above with respect to step 508. This threshold value is the energy level slightly above that at which the UPS 108A will be unable to provide power. This threshold is used to provide server 100 with an advance indication of when installed UPS power module 108A is going to cease providing main and/or standby power. This enables server 100 to take remedial actions, such as saving data to disk, while power is still available.

If the battery energy level is greater than this threshold, then operations continue at step 516 at which UPS control logic 206 generates a power source present signal 222 at pin 8 of hot-plug connector 116A indicating that there is sufficient energy stored in battery 202 to power server 100. Alternatively, at block 518, power source present signal 222 is set to indicate that there is insufficient energy stores in battery 202 to power server 100.

In addition to the energy stored in battery 202, UPS 108A preferably performs self-tests and other monitoring operations to detect faults in DC-to-DC converter circuit 204 and UPS control logic 206. These operations, as noted, are performed at block 512. At block 520, the results of those operations are acted upon. If a fault condition was not detected, then operations advance to block 522 at which fault condition status signal 224 is generated to indicate that installed UPS power module 108A is operational. If a fault was detected, fault condition status signal 224 is set accordingly at block 524. Processing then advances through page connector A to power delivery operations 530 illustrated in FIG. 5B.

The next series of operations are directed to the delivery of power to server 100. As such, blocks 532 through 550 are collectively referred to as power delivery operations 530. The first step performed in connection with the delivery of power to server 100 by installed UPS power module 108A is to determine whether it is possible to provide power. At block 532, the results of the self-test operations described above are considered. If a fault was detected then power is not generated and operations advance through page connector D to operations illustrated in FIG. 5C and described below. However, if no fault was detected, then at block 534 UPS control logic 206 determines whether installed UPS power module 108A is capable of providing power should conditions warrant. This is determined by the state of power enable command 216 generated by power controller 104 of server 100, and which is received at pin 5 of hot-plug connector 116 A.

Typically, server 100 sets power enable command 216 so that all installed UPS power modules 108A are enabled to deliver power should such power delivery be necessary to maintain server power. When server 100 is intentionally shut down for example, to perform repair or maintenance operations, AC power is not provided to installed PSU power modules(s) 108B. Such an occurrence would cause installed UPS power modules 108A to generate main power 208. To prevent this from occurring, power enable command 216 is set to a value that causes installed UPS power module 108A to not detect, or not respond to detecting the cessation of AC power to installed PSU power modules(s) 108B. If power delivery is not enabled, then operations return to block 508 through page connector B. If power delivery is enabled, then operations continue at block 536.

At block 536, UPS control logic 206 monitors conditions in server 100 to determine whether DC power is to be generated. In the embodiment illustrated in FIG. 5B, UPS control logic 206 monitors main power buses 110 and PSU power source status signal 218 received at pin 6 of hot-plug connector 116A. As noted, signal 218 indicates the state of the AC power received by each installed PSU power modules 108B.

At block 538, installed UPS power module 108A determines whether a condition has been detected that requires power generation. With regard to main power buses 110, UPS power module 108A determines whether the power that is delivered by the installed PSU power module 108B is maintained within a predetermined specification. For example, an installed PSU power module 108B may fail, preventing it from generating main and standby power 230, 232. Or perhaps the installed PSU power modules 108B has a partial failure that causes it to generate main and standby power 230, 232 signals that are not in specification. In this embodiment, UPS control logic 206 monitors main power bus voltage to determine whether it falls below some predetermined threshold. Preferably, this threshold is selected to avoid false-positive indications in response to line transients. In addition, UPS control logic 206 determines the rate at which the voltage signal on the main power bus 110 changes. Control logic 206 utilizes the slope of the power signal to determine whether the power signal is experiencing temporary interference or whether it is indicative of a failing PSU power module 108B.

With regard to PSU power source status signal 218, a failure in the AC power source is followed by a failure of the PSU power module itself. Typically, there is a delay of one or two cycles of main power signal 230 from the time when the AC power source fails to the time when installed PSU power module 108A ceases to generate main and standby DC power 230, 232. This time delay is too short to provide the information to server 100 for processing without risking complete loss of power. Rather, PSU power source status signals 218 are provided to installed UPS power module 108A for direct monitoring. Installed UPS power module 108A immediately generates main power 208 upon receipt of an indication that the AC power source to installed PSU power module 108B has failed. Thus, in this aspect of the invention, installed UPS power module 108A determines that DC power should be generated preemptively; that is, prior to the power on main power bus 110 ceasing. This approach insures continual power although it can also often result in installed UPS power module 108A unnecessarily generating power. In such circumstances, when UPS power module 108A determines that it was not necessary to provide power, it ceases doing so and recharges battery 202.

If at block 538 UPS control logic 206 determines that conditions do not warrant generating DC power, then processing continues through page connector B to block 508 in FIG. 5A. Otherwise, standby power 210 is generated at step 540.

A third threshold power level is used to determine whether the installed UPS power module 108A is to generate main power 208 in addition to standby power 210. This threshold power level can be predetermined or dynamically calculated based on information gathered from other operations described above. If the energy stored in battery 202 is above this threshold level then main power 208 is also generated at block 548. At block 550, DC on status signal 226 is generated at pin 10 of hot-plug connector 116A to provide server 100 with an indication that DC power is being generated by this installed UPS power module 108A.

If at block 542 it is determined that battery 202 does not have sufficient power to provide main power 208 in, then main power 208, if provided previously, is terminated at block 544 and DC on status signal 226 is set at block 546 to indicate that main power is not being provided by this installed UPS power module 108A.

Operations continue through page connector D to FIG. 5C, in which steps directed to the recharging of battery 202 are performed. Battery recharge operations 560 include a block 552 at which it is determined whether the energy stored in battery 202 is below the recharge threshold. If not, processing continues at block 508 in FIG. 5A through page connector E. If the battery level has dropped below the recharge threshold, then operations continue at blocks 554 and 556 at which the condition of the main power bus 110 and installed PSU power modules 108B are determined. If main power bus 110 is not within specification, or if the installed PSU power module(s) 108B have a fault condition, then UPS power module 108A will not recharge battery 202 and processing returns to block 508 in FIG. 5A. Otherwise, battery 202 is recharged at block 558. Operations then continue at block 508 where the above operations are repeated.

Figure 6:
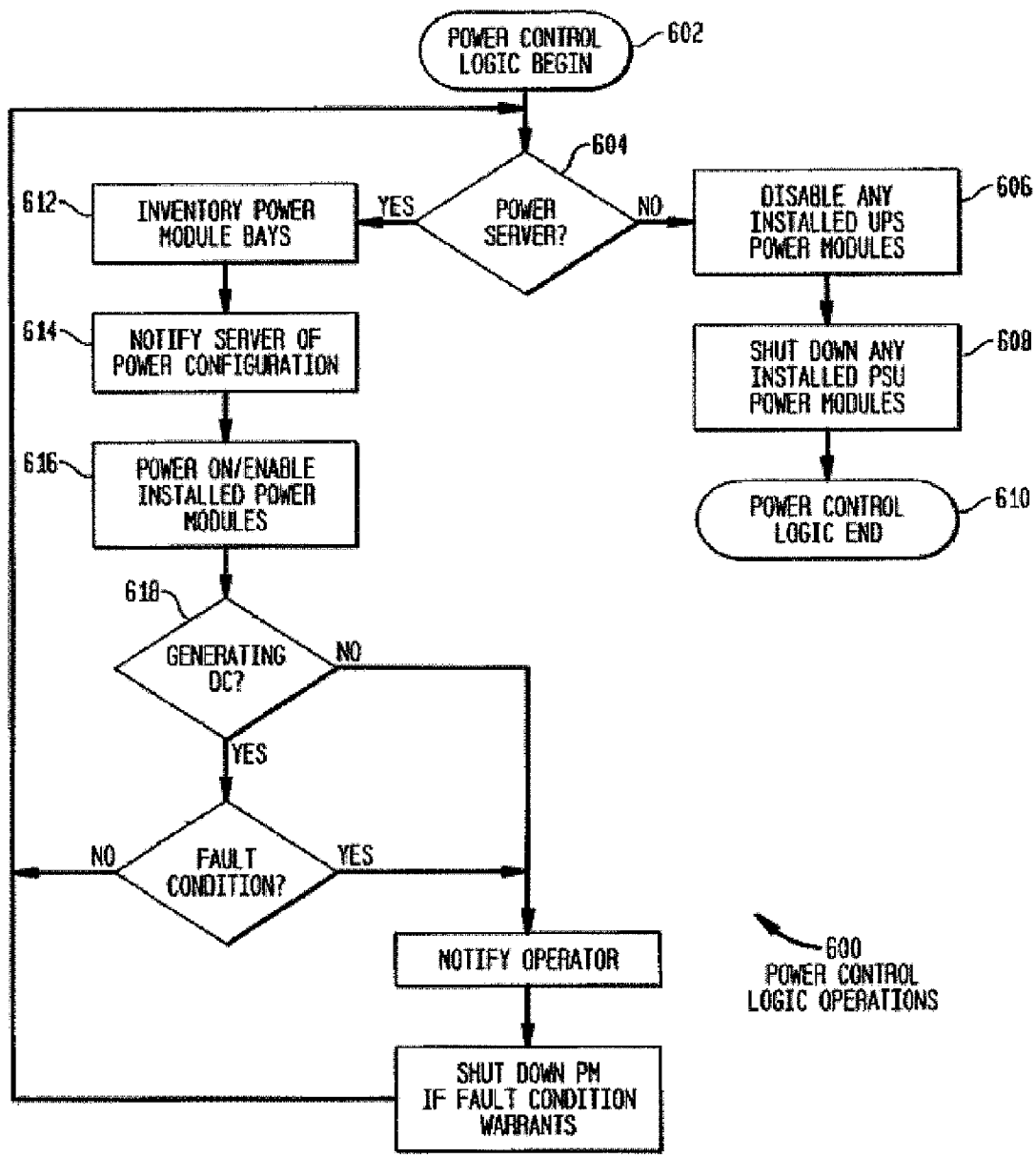
FIG. 6 is a flowchart of the operations performed by the power controller illustrated in FIG. 1 in accordance with one embodiment of the present invention.

FIG. 6 is a flowchart of the operations performed by one embodiment of power controller 104 of the present invention. The sequence of operations illustrated in power control operations 600 are exemplary only; alternative embodiments perform additional and different operations and/or the same operations in a different sequence.

After logic begin block 602, a determination is made by power controller 104 whether system controller 10 has instructed it to turn on power to server 100. If server 100 has been powered previously, and at block 604 it is determined that server 100 is to be powered down, then the operations at blocks 606 and 608 are performed. At block 606 any installed UPS power modules 108A are disabled. Here, power controller 104 sets power enable command 216 to a value indicating that UPS power module 108A is to not generate DC main or standby power 208, 210 when it detects a condition that would otherwise require such power to be generated.

At block 608, any installed PSU power modules 108B are shut down. Here, the AG power that is provided to each installed PSU power module 108B is terminated. In the embodiment illustrated in FIG. 3, this operation is performed by system controller 10. In alternative embodiments, power controller 104 controls high voltage FETs or other circuit devices which gate AC power to installed PSU power modules 108B. Operations then end at termination block 610.

If server 100 is to be powered, as determined at block 604, then operations continue at block 612. At block 612, power module bays 106 are inventoried to determine the current power configuration of server 100. That is, the combination of UPS power modules 108A, if any, and PSU power modules 108B, if any, are determined by monitoring the PMID signals 228, 242, provided by the installed power modules 108. This power configuration is provided to server 100 at block 614. Here, power controller 104 provides the power configuration to system controller 10. System controller 10 performs various operations and controls server 100 based on the power configuration. For example, if the power configuration information indicates that server 100 is powered only by UPS power modules 108A, then server 100 may be controlled so as to perform only necessary functions to preserve battery power.

At block 616, the installed power modules are enabled or turned on. That is, installed PSU power modules 108B are turned on so that they generate main and standby power 230, 232, and load share with other power modules 108. Installed UPS power modules 108A are enabled to begin monitoring installed PSU power modules 108B and main power buses 110 to determine whether UPS power should be generated.

At block 618, DC on status signals 226, 240 are monitored to insure that the installed power modules 108 are generating power as expected.

It should be appreciated from the above that various aspects of the present invention provide certain advantages and overcome certain drawbacks of the conventional power management and power distributions approaches, and that not all aspects of the invention share the same advantages and those that do may not share them under all circumstances. It should also be understood that various changes and modifications of the embodiments shown in the drawings and described in the specification may be made within the spirit and scope of the present invention. For example, in the illustrative embodiment, server 100 includes two power module bays 108A and 108B which are configured to operationally receive power modules 108A, 108B, respectively. In alternative embodiments, additional power module bays 106 are provided. Power module interface board 304 would be configured to provide the requisite electrical connections similar to those described above to enable UPS power module 108A and power controller 104 to perform the operations of the present invention. Configuring a power module interface 118 to provide such interconnections is considered to be within the purview of those of ordinary skill in the art given the above description and, therefore, is not described further herein. As another example, in the illustrative embodiment, power for server 100 is provided only by installed power modules 108. Thus, at least one power module 108 needs to be installed in a power module bay 106 to provide power to server 100. It should become apparent from the above description, however, that power modules 108 may supplement another source of power such as a internal AC power source. A further example is the implementation of a rechargeable battery 202 in the illustrative embodiment of UPS power module 108A. It should be apparent to those of ordinary skill in the art that in other embodiments, a restorable source of stored energy other than a rechargeable battery can be implemented. Another example is the electrical interface described above is a single connector with a plurality of pins. It should be appreciated, however, that the present invention can be implemented in any number and type of electrical connector. It follows, then, that present invention can be implemented with connecting elements other than standard connector pins, such as leads, clips, sockets, lines, pads and the like.

What is claimed is:

1. A power management system for use in a power-consuming system comprising:
   a plurality of power module bays each power module bay comprising a hot-plug connector comprising a plurality of pins and configured to connect to a power module; wherein the hot-plug connector installed in at least one of the plurality of power module bays is capable of interchangeably connecting to either an uninterruptible power supply (UPS) power module or a power supply unit (PSU) power module installed in that power module bay;
   a switch configured to connect at least one pin of a first hot-plug connector of a first power module bay of the plurality of power module bays with a pin of a second hot-plug connector of a second power module bay of the plurality of power module bays based in part on whether a PSU module or UPS module is connected to either the first or second hot-plug connector; and
   a power module interface that provides an electrical connection between power modules installed in the power module bays and one or more power buses in the power-consuming system.

2. The power management system of claim 1, further comprising:
   a power controller that determines a combination of the one or more installed power modules to provide power to the one or more power buses.

3. The power management system of claim 2, wherein the power module interface comprises:
   one or more power lines electrically connecting a hot-plug connector in each of the power module bays to the power buses; and
   one or more signal lines electrically connecting the hot-plug connector in each of the power module bays with the power controller.

4. The power management system of claim 1, wherein the power modules and power module bays are dimensioned such that each power module bay can have installed therein either the UPS power module or the PSU power module.

5. The power management system of claim 1, wherein the UPS power module and the PSU power module have compatible electrical interfaces, and wherein a same power module interface is provided in the power module bays for mating with the compatible electrical interfaces.

6. The power management system of claim 1, wherein all elements for enabling each power module to operate as a DC power source are located in each power module and not the power-consuming system.

7. The power management system of claim 2, wherein the power controller controls the installed power modules based on power requirements of the power-consuming system.

8. The power management system of claim 2, wherein the power controller controls the installed power modules based on operational status of the installed power modules.

9. The power management system of claim 2, wherein the power module interface comprises:
   one or more power lines electrically connecting a hot-plug connector in each of the power module bays to the power buses, wherein the power lines are switched lines controlled by the power controller to selectively interconnect installed power modules with the one or more power buses; and
   one or more signal lines electrically connecting the hot-plug connector in each of the power module bays with the power controller.

10. The power management system of claim 1, wherein the power modules and power module bays are dimensioned such that each power module bay can have installed therein a specific one of either the UPS power module and the PSU power module.

11. A system comprising:
   a plurality of power module bays comprising a bay hot-plug connector capable of interchangeably connecting to either an uninterruptible power supply (UPS) power module or a power supply unit (PSU) power module installed in one of the power module bays
   a hot-pluggable UPS power module removably insertable into one of the power module bays to mate with the hot-plug connector carried in the bay, the UPS power module comprising: a converter circuit that converts DC power generated by a battery into DC power for the system; a controller that controls the operations of the UPS power module based on whether a PSU power module installed in the plurality of power module bays is receiving AC power; and a module hot-plug connector configured to provide an electrical interface with the bay hot-plug connector carried in the bay when the UPS power module is installed in one of the power module bays; and
   a switch configured to connect at least one pin of a first hot-plug connector of a first power module bay of the plurality of bays with a pin of a second hot-plug connector of a second power module bay of the plurality of bays based at least on whether a PSU module or UPS module is connected to either the first or second hot-plug connector.

12. The system of claim 11,
   wherein the PSU power module generates a signal indicating cessation of AC power to the PSU power module, and wherein the PSU power module continues to generate power after loss of AC power for a hold-up time; and
wherein the UPS power module receives an indication of the cessation of AC power to installed PSU power modules, and generates DC power within the hold-up time.

13. The system of claim 11, wherein the module hot-plug connector of the UPS power module has an electrical interface comprising:
a pin at which the UPS power module generates a DC power signal derived from power generated by a rechargeable energy source in the UPS power module; and
a pin at which the UPS power module receives a power enable command generated by the power-consuming system, wherein the UPS power module becomes operational in response to the power enable command.

14. The system of claim 11,
wherein the UPS power module further comprises a rechargeable battery; and
wherein the converter circuit converts DC power generated by the rechargeable battery.

15. A method for controlling an uninterruptible power supply (UPS) power module installed in a plurality of power module bays of a system; wherein there is a first hot-plug connector of a first power module bay of the plurality of bays and a second hot-plug connector of a second power module bay of the plurality of bays, the method comprising:
directing a switch to connect a pin of the first hot plug connector with a pin of the second hot-plug connector based at least on whether a power supply unit (PSU) power module or uninterruptible power supply (UPS) power module is connected to either the first or second hot-plug connector;
determining whether a power signal currently delivered to the system by the PSU power module is within specification;
determining whether AC power is being delivered to the PSU power module; and
causing the UPS power module to generate power when the monitored power signal is not within the specification and when AC power to the PSU power module supply is interrupted.

16. The method of claim 15, further comprising:
monitoring a system-generated power enable command,
wherein the step of causing is performed only when the power enable command indicates that the UPS power module is permitted to generate power.

17. The method of claim 15, further comprising:
determining capability of the UPS power module to generate power;
wherein the step of causing is performed only when the UPS power module is capable of generating power.

18. The method of claim 15, further comprising:
checking periodically whether the UPS power module is installed in a power module bay of the plurality of power module bays; and
generating a power module identification signal identifying the UPS power module when the UPS power module is installed in the power module bay.

19. The method of claim 17, wherein the UPS power module comprises a rechargeable battery, a DC-to-DC converter circuit coupled to the rechargeable battery, and UPS control logic coupled to the converter circuit and providing an external electrical interface, wherein the step of determining the capability of the UPS module comprises:
performing a self-test to detect faults in the DC-to-DC converter circuit and the UPS control logic; and
generating a fault condition status signal indicating the results of the self-test.

20. The method of claim 17, wherein the UPS power module comprises a rechargeable battery, wherein the step of determining the capability of the UPS module comprises:
measuring the energy stored in the UPS power module; and
generating a signal indicating imminent failure of the UPS power module when the energy level stored in the UPS power module falls below a second threshold value greater than minimum threshold value.

21. The method of claim 15, wherein the step of determining whether the power signal currently delivered to the system is within the specification comprises:
monitoring power bus voltage to determine whether it falls below a predetermined threshold.

22. The method of claim 15, wherein the step of determining whether the power signal currently delivered to the system is within the specification comprises:
determining a rate at which power voltage signal on main power bus changes.

23. The method of claim 15, wherein the PSU power module continues to generate power for a first time duration after cessation of AC power to the PSU power module, wherein the causing comprises:
causing the UPS power module to generate power within a second time duration after the cessation of AC power to the PSU power module, wherein the second time duration is shorter than the first time duration.

24. The method of claim 15, further comprising:
recharging the UPS power module when the UPS power module is not generating power.

25. A method for controlling UPS and PSU power modules installed in a plurality of power module bays of a power-consuming system, comprising:
determining system power requirement;
determining whether one of the UPS power modules or one of the PSU power modules are installed in each of the power module bays;
causing the installed UPS power modules to monitor the installed PSU power modules and power buses to determine whether UPS power from the UPS power modules should be generated to meet the determined system power requirement;
causing the installed PSU power modules to generate power and load share with other installed power modules of the UPS and PSU power modules that are concurrently generating power; and
monitoring status signals generated by the other installed power modules to determine which of the other installed power modules are generating DC power.

26. The method of claim 25, wherein, when the system has requested to be powered down, the method further comprising:
disabling the installed UPS power modules; and
after disabling the installed UPS power modules, disabling the installed PSU power modules.

27. The method of claim 26, wherein disabling the installed PSU power modules comprises:
(a) removing AC power supply to each of the installed PSU power modules.

* * * * *

UNITED STATES PATENT AND TRADEMARK OFFICE
CERTIFICATE OF CORRECTION

PATENT NO. : 7,634,667 B2
APPLICATION NO. : 10/193788
DATED : December 15, 2009
INVENTOR(S) : Jeffrey S. Weaver et al.

It is certified that error appears in the above-identified patent and that said Letters Patent is hereby corrected as shown below:

In column 20, line 44, in Claim 11, delete "bays" and insert -- bays; --, therefor.

Signed and Sealed this

Eighth Day of June, 2010

David J. Kappos
*Director of the United States Patent and Trademark Office*